United States Patent [19]
Kirkman

[11] Patent Number: 5,810,047
[45] Date of Patent: Sep. 22, 1998

[54] SUB-SEA COUPLING WITH CONICAL SEAL

[75] Inventor: Douglas F. Kirkman, Ickenham, England

[73] Assignee: Mandeville Engineering Limited, Maidenhead, England

[21] Appl. No.: 821,339

[22] Filed: Mar. 20, 1997

[30] Foreign Application Priority Data

Mar. 22, 1996 [GB] United Kingdom ............... 9606133

[51] Int. Cl.$^6$ .................................................. F16L 29/00
[52] U.S. Cl. .......................... 137/614.01; 137/614.04; 277/236; 285/917
[58] Field of Search .................. 137/614.04, 614.01; 285/917; 277/236, 205

[56] References Cited

U.S. PATENT DOCUMENTS 3,918,485  11/1975  Weber et al. .
4,324,407   4/1982  Upham et al. .
5,339,861   8/1994  Smith, III ..................... 137/614.04
5,479,960   1/1996  Kirkman .

FOREIGN PATENT DOCUMENTS 1569400  3/1977  United Kingdom .

*Primary Examiner*—Kevin Lee
*Attorney, Agent, or Firm*—Nixon & Vanderhye P.C.

[57] ABSTRACT

A sub-sea coupling comprises a female coupler which accommodates a conical metal seal and an adjacent striker constituted by a sliding ring. The female coupler also includes a U-section seal outwardly of the striker. A male coupler has a forward probe with an intermediate part of slightly greater diameter than the extreme forward part. A shoulder between the intermediate and extreme parts of the probe engages the striker to cause the conical seal to flatten and thereby to provide a metal-to-metal radial seal between the female coupler and the male coupler. The U-section seal provides a seal against the intermediate part of the probe before the striker is engaged and is also configured to provide no significant resistance to the ingress of seawater when the couplers are disengaged.

7 Claims, 2 Drawing Sheets

SUB-SEA COUPLING WITH CONICAL SEAL

FIELD OF THE INVENTION

This invention relates to couplings for fluid lines and particularly to couplings which are employed to couple high pressure hydraulic lines in sub-sea control systems and similar circumstances.

BACKGROUND TO THE INVENTION

A coupling for high pressure lines, particularly those intended for use sub-sea, normally comprises a female coupler or receiver and a male coupler or probe insertable in the receiver. They are customarily self-sealing and include mutually engageable means, normally spring-loaded poppet valves, which provide a respective seal at the end of the hydraulic line to which the respective coupler is attached when the male and female couplers are separated and which engage mutually when the coupling is made up so that high-pressure fluid can flow from one coupler to the other. It is necessary to provide at least one seal between the couplers and normally at least two seals between them in order to prevent egress of hydraulic working fluid from the coupling and, particularly for use sub-sea, to inhibit ingress of seawater into the interior of the coupler. Such couplers and seals are required to be durable and reliable because they normally must remain operational for very long periods of time.

Various different forms of seal have been proposed. It has been customary to employ a metal seal as the primary seal in order to provide a metal to metal seal between the male and female couplers. In recent years pressure responsive seals, that is to say annular seals with a C-shaped or other hollow section, expanded laterally by hydraulic pressure within the coupling when the couplers are mated, have been used.

Other forms of coupling employ different forms of seal between axially confronting parts of the couplers. One such seal is a conical metal seal. For example, U.S. Pat. No. 3,918,485 discloses a conical seal which is disposed in an annular shoulder formed in the female coupler and is engaged by a tapered annular shoulder on the male coupler.

U.S. Pat. No. 4,324,407 discloses the use of a conical seal which is carried on a male coupler and is caused to flatten when a primary O-ring seal is axially displaced.

It is customary to provide an additional backup seal between the outer periphery of the male coupler and the inner periphery of the female coupler. Such a seal is usually an O-ring seal.

Most existing designs of sub-sea couplers suffer to a greater or lesser extent from hydraulic lock, seal wash-out or high insertion forces. Hydraulic lock occurs when the male and female couplers are engaged and a seal such as the backup seal between the male and female couplers traps fluid in the space between the couplers. The problem is particularly prevalent when the male probe has a uniform diameter over the length which engages the seals. It is also prevalent when the backup seal is an O-ring seal. Wash-out occurs when the couplers are separated and the poppet valves or like sealing means seal against their respective valve seats. There is a tendency to create a vacuum while the seals still provide sealing between the male and female couplers and an inrush of seawater tends to displace the seals. Finally, many designs require unduly high forces to complete the engagement of the seals.

The object of the present invention is an improved coupling which is not particularly subject to hydraulic lock or wash-out and which only requires moderate insertion forces.

SUMMARY OF THE INVENTION

The invention is based on the use of a conical sealing ring and a striker which is engaged, to compress the conical seal, by the pa ssage of a shoulder or peripheral feature on the male coupler. Preferably the male coupler has a sealing diameter which is reduced at its forward end. The coupling preferably includes a backup seal which is preferably a U-form seal that will readily allow ingress of seawater but will resist egress of hydraulic fluid from the interior of the coupling.

DESCRIPTION OF PREFERRED EMBODIMENT

Figure 1:
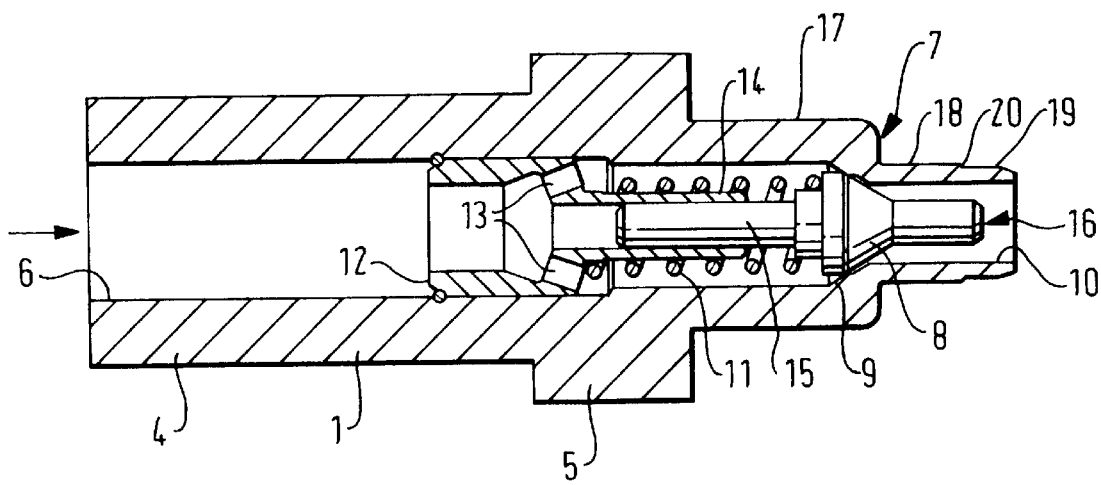
FIG. 1 illustrates a male coupler of a coupling according to the invention.

The coupling shown in the drawings is intended for use in a sub-sea control system as a coupling between two hydraulic lines which may have a line pressure of several thousand psi. The pair of lines may be individual but various installations require a multiplicity of pairs of lines and in such cases a plurality of female couplers and a plurality of male couplers respectively may be mounted in a base and a stab plate which are brought together so as to simultaneously make up a multiplicity of couplings.

Figure 2:
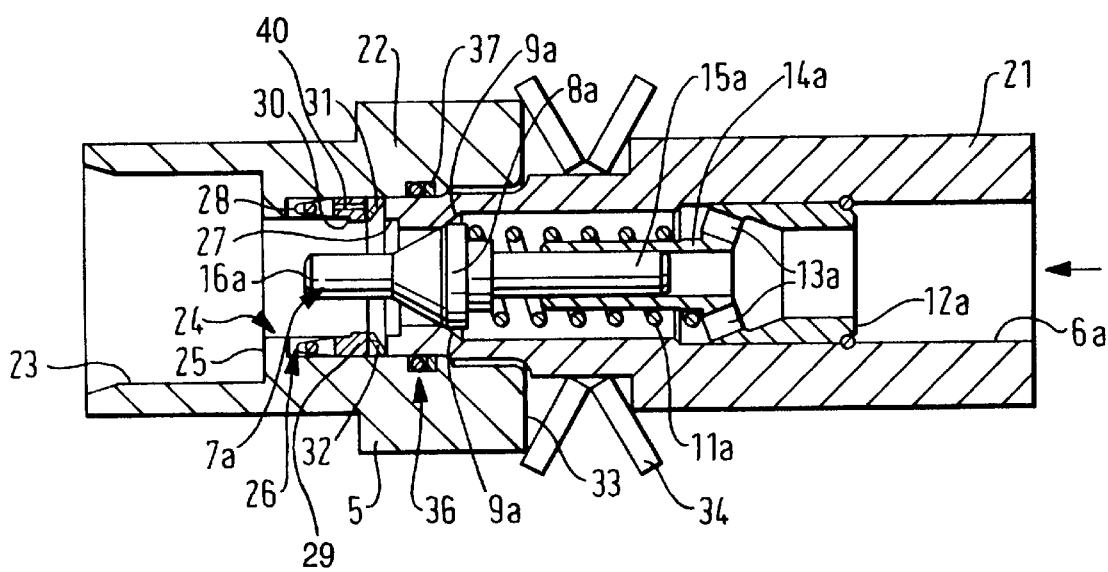
FIG. 2 illustrates a female coupler of a coupling according to the invention.
Figure 3:
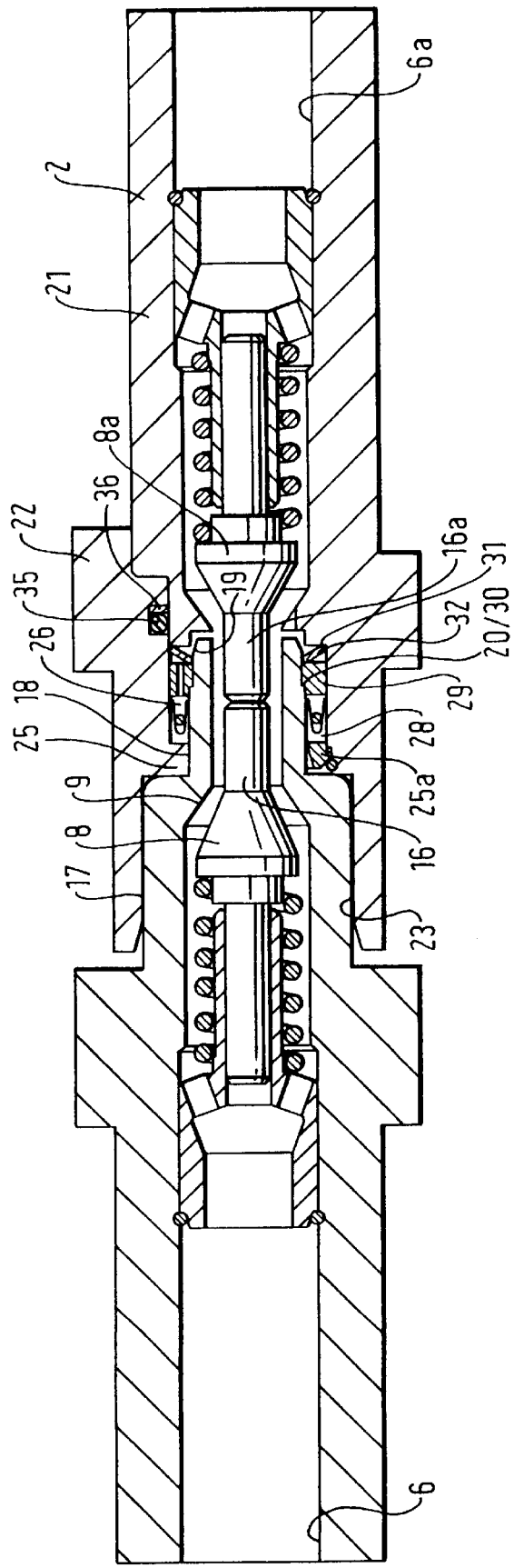
FIG. 3 illustrates a coupling wherein the male and female coupler s are engaged or 'made-up'.

The male coupler 1 shown in FIG. 1 is adapted to mate with the female coupler 2 shown in FIG. 2 so as to form a made up coupling 3 as shown in FIG. 3.

The male coupler 1, as shown in FIG. 1, has a main body 4 with an external flange 5 and an axial bore 6 in which is disposed a self-sealing valve 7. This valve preferably comprises a poppet 8 which can seal against a conical seat 9 constituting a transition between the main bore 6 and a bore 10 of lesser diameter and extending to the forward end of the body 4.

The poppet 8 is urged against the seat 9 by means comprising a helical compression spring 11 engaging the rear of the poppet and supported at its other end by a cylindrical insert 12 in the bore 6. The insert 12 has apertures 13 for allowing hydraulic fluid to flow from the bore to the forward end of the valve under the control of the poppet 8. The insert has a cylindrical extension 14 which supports a rearward spigot 15 extending back from the poppet 8, whereby the poppet 8 is kept in alignment with the seat 9.

Extending forwards of the poppet 8 is a push rod 16 for engagement with a push rod on a valve within the female coupler.

The male coupler 1 is shaped as a probe at its forward end, having successively smaller external diameters. The body of the coupler has a first portion 17, forward of the flange 15 and having a diameter corresponding to part of an internal bore of the female coupler soon to be described. Forward of this portion 17, the probe comprises an intermediate part 18 which is of slightly greater diameter than an extreme forward part 19, there being an annular shoulder 20 between the parts 18 and 19.

The purpose of the larger diameter part 17 is to centre the male coupler relative to the female coupler prior to the final make-up of the couplers.

The female coupler has a body part 21 including a valve 7a and a coupling head 22 which may engage the main body by means of a screw threading. An alternative construction wherein the body and head are integral is illustrated in part of FIG. 3 and will be described later.

The coupling head 22 has a main outer bore 23 into which the part 17 of the male coupler 1 fits and an inner bore 24 containing seals to be described.

The axial bore 6a in the body 21 of the female coupler 2 contains the self-sealing valve 7a which is mutually engageable with and generally similar to the valve 7 in the male coupler. This valve 7a preferably comprises a poppet 8a which can seal against a conical seat 9a formed in the bore 6a. The poppet 8a is urged against the seat 9a by means comprising a helical compression spring 11a engaging the rear of the poppet and supported at its other end by a cylindrical insert 12a in the bore 6. The insert 12a has apertures 13a for allowing hydraulic fluid to flow from the bore to the forward end or vice versa of the valve under the control of the poppet 8a. The insert has a cylindrical extension 14a which supports a rearward spigot 15a extending back from the poppet 8a, whereby the poppet 8a is kept in alignment with the seat 9a.

Extending forwards of the poppet 8a is a push rod 16a. The push rods 16, 16a of the valves 7 and 7a abut when the couplers are mated so as to lift the poppets 8 and 8a off their seats 9 and 9a to permit fluid flow through and between the couplers. On disengagement of the couplers the rods 16 and 16a disengage and the springs 11 and 11a reseat the poppets onto their seats 9 and 9a thereby closing the valves and the ends of the lines to which the couplers are attached.

The bore 24 is defined by an inner annular flange 25. Inwards of this flange is an annular recess 26 in the bore 24, the recess extending from the flange 25 to a shoulder 27 constituted by the front face of the body 21.

The recess 26 contains an annular U-section elastomeric ring seal 28 of which the 'U' faces inwardly. The ring seal 28 seats against the inward face of the flange 25.

The recess 26 also contains a movable striker 29 in the form of a ring which is a sliding fit in the annular recess 26. This striker ring is preferably apertured longitudinally so as to provide a fluid passage 40 from one side of the ring to the other. The ring also has an inner radially extending annular shoulder 30 which can be engaged by the shoulder 20 between the extreme forward part 19 and the intermediate part 18 of the male coupler. Thus as the male coupler is engaged with the female coupler, the striker can be moved inwards relative to the female coupler.

In the notch 31 formed by the recess 26 and the shoulder 27 at the axial end face of the main body of the female coupler is a metal conical seal 32 which is slightly larger in slant height than the difference between the external diameter of the forward part 19 of the male coupler and the diameter of the recess 26. This conical seal 32 can be flattened by the striker 29 to a state wherein the seal 32 provides a radial seal between the couplers and particularly between the inner periphery of the female coupler and the periphery of the part 19 of the male coupler.

When the couplers 1 and 2 are moved towards the made-up position, the large diameter part 17 of the probe which constitutes the forward extension of the male coupler engages the outer bore 23 in the coupling head and positions the forward part of the probe in line with the bore 24 in the female coupler. Further mutual closure of the couplers causes the probe to pass the U-section ring seal 28, the striker 29 and the conical seal 32.

The U-seal 28 engages and seals against the intermediate part 18 of the probe before the push rods 16, 16a of the poppet valves come into contact. Further closure of the couplers partially opens the poppet valves to allow fluid pressure to flow between the couplers. Initial leakage from the joint between the couplers is prevented by the U-seal 28.

Further mutual closure of the couplers causes the shoulder 20 on the probe to engage the corresponding shoulder 30 on the striker 29. The striker is thereby moved to engage the conical seal and to deform the conical seal 32 to a flatter condition, whereby the inner and outer edges of the seal engage the inner diameter of the coupling head and the outer periphery of the male probe's forward part 19. The conical seal thereby provides an effective, metal-to-metal seal between the couplers.

The axially facing surfaces of the striker 29 and the female coupler may be made concave to allow a greater change in the cone angle of the seal.

When many couplings need to be engaged and made-up together as required in stab plates and mounting bases, the manufacturing tolerances may be too precise to permit all the couplings to seal at the same make-up distance. To overcome this difficulty, the female body may have an external recess 33 which accommodates external springs 34 (FIG. 2) which enable the female coupler to be spring-loaded into the working position. The heavy springs provide approximately one millimetre of over-travel from the make-up position. The spring forces involved are larger than the separation forces which occur from line pressure.

The inner sealing diameters of the U-ring seal 28 and the conical seal 32 are different, the latter being smaller such that during the make-up action there is a tendency for the pressure of the fluid contained between the two seals to be reduced. This avoids the known phenomenon of hydraulic lock.

When the couplers are separated, the two poppet valves reach a point where they disengage and seal against their respective valve seats. In many designs of coupler, further separating movement of the couplers would create a vacuum, the suction of which is augmented by the external pressure of seawater to produce a rapid inrush which can displace many forms of seal. In the preferred form as described, the U-ring, which by virtue of its hollow section can provide a radial seal in response to internal fluid pressure, has much less resistance to external fluid pressure and allows seawater to enter the space formed by the disengaging couplers. Thus the U-ring seal 28 avoids the formation of a vacuum during disengagement and thereby avoids the consequent inrush which might otherwise displace the seals located between the male and female couplers.

In the embodiment as described so far, the U-ring seal 28, the striker 29 and the conical seal 32 are disposed within a recess formed between the coupling head and the main body of the female coupler, and the coupling head is formed separately from the main body, there being an O-ring 35 and packing ring 36 in a recess in the coupling head 22 to provide a redundant seal between the head 22 and the body 21. The lower part of the body shown in FIG. 3 illustrates a different construction, in which the coupling head and the main body are formed mostly as one piece and the inner flange defining the outer end of the recess 26 is formed as a ring 25a which fits into an annular groove at the end of the bore 24 and is secured by a spring clip.

I claim:

1. A fluid coupling adapted for the sub-sea releasable connection of high-pressure hydraulic lines and comprising a female coupler and a male coupler insertable therein, the female coupler including a conical metal seal, a movable striker operative on entry of the male coupler into the female coupler to cause said seal to flatten towards a sealing configuration producing a radial seal between the male and female couplers, and a second seal for sealing radially between the female and male couplers, said second seal being oriented to resist egress of hydraulic fluid from the coupling but to allow ingress of seawater when the couplers are initially disengaged.

2. A coupling according to claim 1, wherein said male coupler has a forward probe part comprising an intermediate part and an extreme part of lesser diameter than the intermediate part and a shoulder, between said extreme part and said intermediate part, positioned for engagement with said striker.

3. A coupling according to claim 2, wherein said conical seal engages said extreme part of the probe.

4. A coupling according to claim 1, wherein said second seal is a U-section seal disposed axially outwardly of said striker and positioned to engage the periphery of said male coupler before said striker engages said conical metal seal during said entry.

5. A coupling according to claim 1, wherein said striker is an annular ring having an annular shoulder for engagement by the male coupler and said striker includes at least one longitudinal fluid flow passage.

6. A fluid coupling comprising a female coupler and a male coupler insertable therein, the couplers including mutually engageable self-sealing means for allowing fluid to flow between the couplers on the mating thereof, said female coupler including a conical metal seal positioned for sealing between an inner part of the female coupler and a peripheral part of the male coupler; striker means positioned for engagement with said conical seal and movable to cause said conical seal to flatten towards a sealing configuration producing a radial seal between the male and female couplers as said male and female couplers execute a mating movement; and a U-section seal positioned to engage the periphery of said male coupler for providing a radial seal around said male coupler before said striker means engages said conical metal seal, said U-section seal being oriented to resist the egress of fluid from a space between the couplers and to provide little resistance to external fluid pressure.

7. A coupling according to claim 6, wherein said conical seal has a smaller inner sealing diameter than said U-section seal.

* * * * *